(12) United States Patent
Jeong et al.

(10) Patent No.: US 9,499,717 B2
(45) Date of Patent: Nov. 22, 2016

(54) ONE COAT PAINTING COMPOSITION FOR HIGH GLOSS AND COATING METHOD THEREOF

(71) Applicants: Hyundai Motor Company, Seoul (KR); Kia Motors Corporation, Seoul (KR); Noroo Bee Chemical Co., Ltd., Cheonan, Chungcheongnam-Do (KR); ECOPLASTIC CORPORATION, Gyeongju, Gyeongsangbuk-Do (KR)

(72) Inventors: Phil Jung Jeong, Gyeonggi-Do (KR); Dong Eun Cha, Gyeonggi-Do (KR); Seung Mok Lee, Gyeonggi-Do (KR); Hyun Gyung Kim, Gyeonggi-Do (KR); Jig Gyun Jung, Gyeongsangbuk-Do (KR); Jae Beom Ahn, Gyeonggi-Do (KR); Young Seok Kim, Chungcheongnam-Do (KR); Sung Hun Kim, Gyeonggi-Do (KR); Young Chool Kim, Gyeongsangbuk-Do (KR); Chang Ho Song, Busan (KR)

(73) Assignees: Hyundai Motor Company, Seoul (KR); Kia Motors Corporation, Seoul (KR); Noroobee Chemical Co., Ltd., Cheonan, Chungcheongnam-do (KR); Ecoplastic Corporation, Gyeongju, Gyeongsangbuk-do (KR)

( * ) Notice: Subject to any disclaimer, the term of this patent is extended or adjusted under 35 U.S.C. 154(b) by 160 days.

(21) Appl. No.: 14/109,106

(22) Filed: Dec. 17, 2013

(65) Prior Publication Data
US 2015/0079295 A1   Mar. 19, 2015

(30) Foreign Application Priority Data

Sep. 16, 2013 (KR) .......................... 10-2013-0111268

(51) Int. Cl.
| | | |
|---|---|---|
| B05D 3/02 | (2006.01) | |
| C09D 5/00 | (2006.01) | |
| C09D 133/00 | (2006.01) | |
| C09D 167/00 | (2006.01) | |
| C09D 167/02 | (2006.01) | |
| C09D 133/06 | (2006.01) | |
| C09D 133/08 | (2006.01) | |
| B32B 27/18 | (2006.01) | |
| B32B 27/30 | (2006.01) | |
| B32B 27/36 | (2006.01) | |

(52) U.S. Cl.
CPC ......... *C09D 167/02* (2013.01); *C09D 133/066* (2013.01); *C09D 133/08* (2013.01)

(58) Field of Classification Search
None
See application file for complete search history.

(56) References Cited

U.S. PATENT DOCUMENTS 5,290,848 A * 3/1994 Palmer ................. C09D 133/10
                                                            524/517

FOREIGN PATENT DOCUMENTS

| JP | 2012-097260 | 5/2012 |
| JP | 2012-236175 | 12/2012 |
| KR | 10-2000-0045053 A | 7/2000 |
| KR | 10-0402268 B1 | 10/2003 |
| KR | 10-0917393 | 9/2009 |
| KR | 10-2012-0003690 | 1/2012 |
| KR | 10-2012-0110603 A | 10/2012 |
| KR | 10-2013-0048863 | 5/2013 |
| KR | 10-2013-0062576 A | 6/2013 |

* cited by examiner

*Primary Examiner* — Michael J Feely
(74) *Attorney, Agent, or Firm* — Mintz Levin Cohen Ferris Glovsky and Popeo, P.C.; Peter F. Corless

(57) ABSTRACT

Disclosed is a one coat painting composition comprising a base including a polyester resin in an amount of about 15 to 45 wt %, a first acrylic resin in an amount of about 15 to 25 wt %, and a second acrylic resin in an amount of about 35 to 65 wt % and a coating method thereof. The composition makes it possible to maintain and improve a high gloss finish of a high gloss injection molded substrate through a single primary coating on the substrate and satisfies environment resistant properties of exterior parts, such as adhesiveness, weather resistance, and scratch resistance, and, thus, is widely suitable for use on exterior plastic parts of automobiles.

9 Claims, 4 Drawing Sheets

PRIOR ART

ONE COAT PAINTING COMPOSITION FOR HIGH GLOSS AND COATING METHOD THEREOF

CROSS-REFERENCE TO RELATED APPLICATIONS

This application claims priority to and the benefit of Korean Patent Application No. 10-2013-0111268 filed in the Korean Intellectual Property Office on Sep. 16, 2013, the entire contents of which are incorporated herein by reference.

TECHNICAL FIELD

The present invention relates to a one coat painting composition for application to a high gloss surface and a coating method thereof, and more particularly, to a one coat painting composition for coating on a high gloss plastic substrate, and a coating method thereof. The one coat painting composition may contain an acrylic resin, a reaction catalyst, a wetting additive, a photostabilizer, and a solvent in adequate amounts in a polyester resin for maintaining and improving a high gloss image of a surface, and for providing parts for exterior applications with environmentally resistant properties.

BACKGROUND ART

Recently, to provide a more sophisticated design and to keep in line with the growing trend for black high gloss automobiles, black gloss paint has been applied to exterior parts of automobiles. In particular, two or three coats of black gloss paint is typically applied on an injection molded plastic substrate, and the black gloss paint accounts for about 50% or more of the total costs thereof. As such, there is an economic problem, as well as other difficulties in applying such black gloss paint.

For this reason, paintless high gloss technologies have recently been developed. Such technologies include a rapid heat cycle molding method and the like. Korean Patent Laid-open Publication No. 2013-48863 relates to a device and a method for manufacturing a high gloss component for a vehicle, by which a high gloss component for a vehicle can be manufactured. However, a completely paintless material such as the one provided cannot satisfy the required environmental resistant properties, such as a weather resistance and scratch resistance.

Korean Patent No. 10-917393 relates to a UV curable painting composition for color coating. In particular, a composition is described for improving the reliability in a heat resistance, cosmetic resistance, an adhesive property, a wear property, and the like. However, the described composition provides properties that are more suitable for plastic substrates of mobile phones or the like, as well as household items. Further, the composition is limited to application of a single coat on a high gloss plastic substrate for maintaining and improving a black high gloss image.

Therefore, there is an urgent need for a composition that is suitable for a single coat application and which imparts a high gloss finish to exterior parts.

SUMMARY OF THE INVENTION

In order to solve such problems, the present inventors discovered that if an acrylic resin, a reaction catalyst, a wetting additive, a photostabilizer, and a solvent are adequately mixed with a polyester resin, a painting composition is provided which maintains and improves black high gloss finishes of exterior parts, satisfies environment resistant properties for such exterior parts, and reduces costs by reducing the number of coatings required.

According to one aspect, the present invention provides a one coat painting composition. The one coat painting composition is particularly suitable for coating a high gloss injection molded substrate obtained by a paintless high gloss technology. According to preferred embodiments, the painting composition provides a finish that satisfies environment resistant properties of exterior parts. In other words. The finish is resistant to environmental factors to which the part is exposed, particularly to such parts which are used in an external environment.

According to an exemplary embodiment, the one coat painting composition comprises a polyester resin in an amount of about 15 to 45 wt %, a first acrylic resin in an amount of about 15 to 25 wt %, and a second acrylic resin in an amount of about 35 to 65 wt %, wherein the wt % are based on the total weight of the one coat painting composition. The combination of the polyester resin, first acrylic resin and second acrylic resin total 100 wt % and are referred to collectively as the "base" herein.

According to another aspect, the present invention provides a method for coating the painting composition described herein.

According to an exemplary embodiment, the method for coating the one coat painting composition is carried out through curing. Such a method provides a high gloss finish. According to various embodiments, the curing is carried out through the use of a curing agent. The curing agent is not particularly limited, and any known curing agents can suitably be used.

According to exemplary embodiments of the present invention, even if only a primary coating (i.e. one coat) of the present coat painting composition is applied on a high gloss injection substrate, particularly a high gloss substrate obtained by a paintless high gloss technology, it is possible to maintain and improve a the high gloss finish of the substrate. It is further possible to satisfy environment resistant properties required of exterior parts, such as an adhesive property, weather resistance, and scratch resistance.

As compared with existing curable clear coats, the one coat painting composition according to exemplary embodiments of the present invention provides excellent exterior appearance (high gloss) by using a combination of a curable polyester resin and an acrylic resin as a main material. Further, the one coat painting composition improves marketability of exterior plastic parts of 1.5 automobiles, particularly adhering to a mold heat and cool injection material during an injection process without deterioration of the existing high gloss (a gloss of about 95 to 98 as measured at 60° C. by using a glossmeter) thereof).

As compared with existing secondary to tertiary coating paints, the one coat painting composition according to the present invention makes it possible to maintain and even improve a high gloss finish of a substrate. Further, the one coat painting composition satisfies required environment resistant properties through only a primary coating, and also makes it possible to reduce costs by reducing the number of coatings required.

According to embodiments of the present invention, the composition can be applied to plastic parts, and is particularly suitable for use in coating exterior parts of automobiles which require a black high gloss finish.

Other aspects and exemplary embodiments of the invention are discussed infra.

BRIEF DESCRIPTION OF THE DRAWINGS

The above and other features and advantages of the present invention will become more apparent by describing in detail exemplary embodiments thereof with reference to the attached drawings in which.

Figure 1:
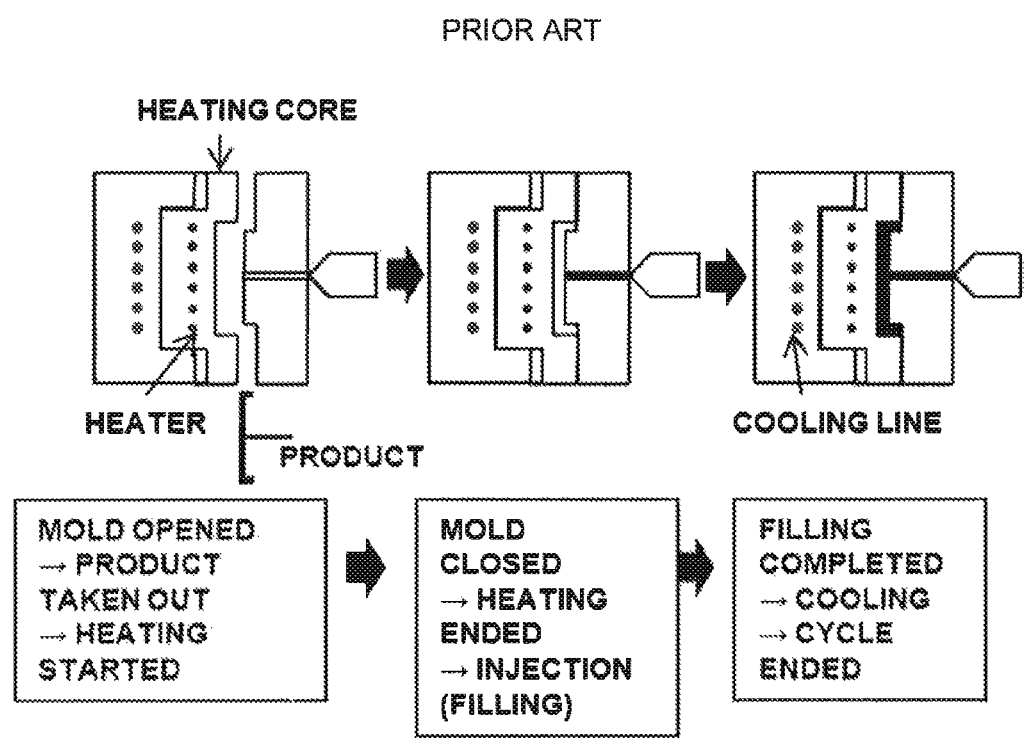
FIG. 1 is a process diagram exhibiting injection molding using a high gloss part manufacturing apparatus developed by the present applicant.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the present invention will be explained in detail with reference to an exemplary embodiment.

First of all, the exemplary embodiments described herein and the configurations shown in the drawings are the most preferable exemplary embodiments of the present invention and do not fully cover the spirit of the present invention; therefore, it should be understood that there may be various equivalents and modifications that can replace them at the time of the application.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

The present invention provides a painting composition having a high gloss finish comprising 100 wt % of a base comprising a polyester resin in an amount of about 15 to 45 wt %, a first acrylic resin in an amount of about 15 to 25 wt %, and a second acrylic resin in an amount of about 35 to 65 wt %, and a coating method thereof. The painting composition is particularly suitable for application on a high gloss substrate, and is capable of being applied in a single coat to provide the substrate with a desired high gloss finish.

According to various embodiments, the polyester resin contains a solid in an amount of about 80 wt % with respect to the total weight (i.e., 80 wt % of solid and 20 wt % of solvent relative to 100 wt % of the total resin). The polyester resin can be any conventional polyester resin, and according to preferred embodiments, has a weight-average molecular weight of about 3000 to about 10000 and a hydroxyl group content of about 2 to 4 mol %. The polyester resin is capable of providing an excellent exterior appearance, such as glossiness and leveling (wherein leveling relates to the external appearance, generally expressed as the degree of wrinkling and/or creasing, e.g. good leveling or poor leveling), particularly by cross linking with a curing agent, such as an isocyanate curing agent.

According to embodiments of the invention, the polyester resin is produced through a condensation reaction between an alcohol compound and an acid. The alcohol compound is preferably selected from including adipic acid and/or isophthalic acid, and the acid is preferably selected from diethylene glycol and/or methylpropanediol. In this case, the polyester resin may be used in an amount of, preferably, about 15 to 45 wt %, and more preferably, about 20 to 40 wt % based on the total weight of the base. The polyester resin produced through the condensation reaction improves linearity (CF value) and an impact resistance of the painting composition after it has been coated on a surface. If the polyester resin is used in an amount of less than about 15 wt %, cracks may occur or an exterior appearance may deteriorate. If the polyester resin is used in an amount of more than about 45 wt %, a coating film hardness may be decreased and stickiness may occur on the surface. Therefore, it is desirable to use the polyester resin in the above range.

The first acrylic resin preferably has a weight-average molecular weight of about 6000 to about 15000, an acid value of about 2 to 6 mg KOH/g, a hydroxyl group content of about 1 to 5 mol %, a glass transition temperature of about 20 to 30° C., and a solid content in an amount of about 60 wt % or more (i.e., 60 wt % of solid and 40 wt % of solvent relative to 100 wt % of the total resin). When the first acrylic resin in the above ranges is used, a high gloss (95 or more as measured at 60° C. by using a glossmeter) can be achieved and coating workability can be improved. Preferably, the first acrylic resin is used in an amount of about 15 to 25 wt %, based on total weight of the base If the first acrylic resin is used in an amount of less than about 15 wt %, initial adhesion (i.e., adhesion of the coating to the substrate) may be unstable. On the other hand, if the first acrylic resin is used in an amount of more than about 25 wt %, a coated exterior appearance such as leveling (i.e., smoothness of the coating surface) may deteriorate.

Preferably, the second acrylic resin has a weight-average molecular weight of about 6000 to about 15000, an acid value of about 0.5 to 2 mg KOH/g, a hydroxyl group content of about 0.2 to 2 mol %, a glass transition temperature of about 70 to 80° C., and a solid content in an amount of about 40 wt % or more (i.e., 40 wt % of solid and 60 wt % of solvent relative to 100 wt % of the total resin). When the second acrylic resin in the above ranges is used, a coating film hardness can be increased and an adhesive property (i.e., adhesion of the coating to the substrate) can be improved. According to preferred embodiments, the second acrylic resin is used in an amount of about 35 to 65 wt %, and more preferably, about 40 to 65 wt %, based on total weight of the base. When the second acrylic resin is used in an amount of less than 35 wt %, a pencil hardness of the coating may be decreased and adhesion (i.e., adhesion of the coating to the substrate) may not last due to a decrease in water resistance. On the other hand, if the second acrylic resin is used in an amount of more than 65 wt %, cracks may occur on a coating film when subjected to impact and bending (i.e., impact resistance may be decreased and flexibility may also be decreased).

The first and second acrylic resins can be manufactured as polymers through any known methods, and preferably are manufactured through a radical polymerization reaction. For example, the resins may be manufactured through a radical polymerization reaction of one or more monomers having a vinyl double bond of acrylic acid ester and/or methacrylic acid ester in a solution by using a pyrolysis initiator.

With respect to 100 parts by weight of the base which comprises the polyester resin in an amount of about 15 to 45 wt %, the first acrylic resin in an amount of about 15 to 25 wt %, and the second acrylic resin in an amount of about 35 to 65 wt %, one or more catalysts, wetting additives and/or stabilizers may be further included. For example, about 1.0 to 1.5 parts by weight of a urethane reaction catalyst, about 0.1 to 1 part by weight of a polyester siloxane-based wetting additive, and/or about 1.0 to 1.5 parts by weight of a photostabilizer may be further contained relative to 100 parts by weight of the base.

The reaction catalyst is preferably a urethane reaction catalyst, and may specifically include dibutyltin dilaurate. A main component (a hydroxyl group) of the urethane reaction catalyst and a curing agent (isocyanate) can improve a reaction rate. With respect to 100 parts by weight of the base, it is desirable to use about 1.0 to 1.5 parts by weigh of the reaction catalyst. If the reaction catalyst is less than 1.0 part by weight, a reaction cannot be carried out sufficiently, resulting in a decrease in a coating film hardness and a curing density and deterioration of chemical resistance, On the other hand, if the reaction catalyst is more than 1.5 parts by weight, a reaction rate is too high and a pot life (i.e, the amount of time that the painting composition remains in a fluid liquid state, allowing for its proper application) is decreased, resulting in deterioration of workability.

The wetting additive is preferably a polyester siloxane-based additive, and may include BYK-306. The wetting additive can improve a wetting property and leveling of a coating film. With respect to 100 parts by weight of the base, it is desirable to use about 0.1 to 1.0 part by weight of the wetting additive. When the wetting additive is less than 0.1 parts by weight, an effect of adding the wetting additive is insignificant and an exterior appearance (leveling) may deteriorate. On the other hand, if the wetting additive is more than 1.0 part by weight, re-paintability may deteriorate.

The photostabilizer is preferably a UV absorber, and may include Tinuvin 1130(UVA) and Tinuvin 292 (HALS) individually or in combination. The photostabilizer can improve a weather resistance of the coating. With respect to 100 parts by weight of the base, it is desirable to use about 1.0 to 1.5 parts by weigh of the photostabilizer. If the photostabilizer is less than 1.0 part by weight, an effect of adding the photostabilizer is insignificant and a color of the coating may change after a lapse of long time. On the other hand, if the photostabilizer is more than 1.5 parts by weight, a storability of the paint may be unstable and a production cost may increase. Therefore, it is desirable to use the photostabilizer in the above range.

Preferably, the solvent may include at least one selected from the group consisting of ester-based solvents, aromatic hydrocarbon-based solvents, and ketone-based solvents. A content of the solvent may vary depending on a required thickness of a coating film and a coating film forming method. According to exemplary embodiments, about 30 to 40 parts by weight of the solvent with respect to the total weight base may be used. The solvent makes it easier to carry out a coating process, and by means of adjusting a volatilization rate of the solvent, the solvent is important for obtaining smoothness of a coating film.

A curing agent may be added to the painting composition to cure the coated composition. In this case, desirably, as the curing agent, a hexamethylene diisocyanate trimer-based agent, which having a resistance to fading and an excellent weather resistance may be used. It is desirable to mix the curing agent with a hydroxyl group as a main component of the reaction catalyst at a ratio of about 1:2 to 1:4 wt % (curing agent:hydoxyl group).

If the curing agent and the hydroxyl group as a main component of the reaction catalyst are mixed at a ratio outside of the range of 1:2 to 1:4 wt %, unreacted hydroxyl group or curing agent may remain and a coating film is not formed. Therefore, it is desirable to use the curing agent in the above range.

In this case, it is desirable to carry out a coating process with a composition having a coating viscosity of from about 3.0 to about 15.0 sec (Ford cup #4) by using a thinner. More particularly, a high gloss material ejected through an injection molding process is pre-treated with isopropyl alcohol and coated to a thickness of about 30 to 35 µm with a high hardness transparent painting composition according to the present invention and then cured at about 80° C. for about 30 minutes.

Figure 2:
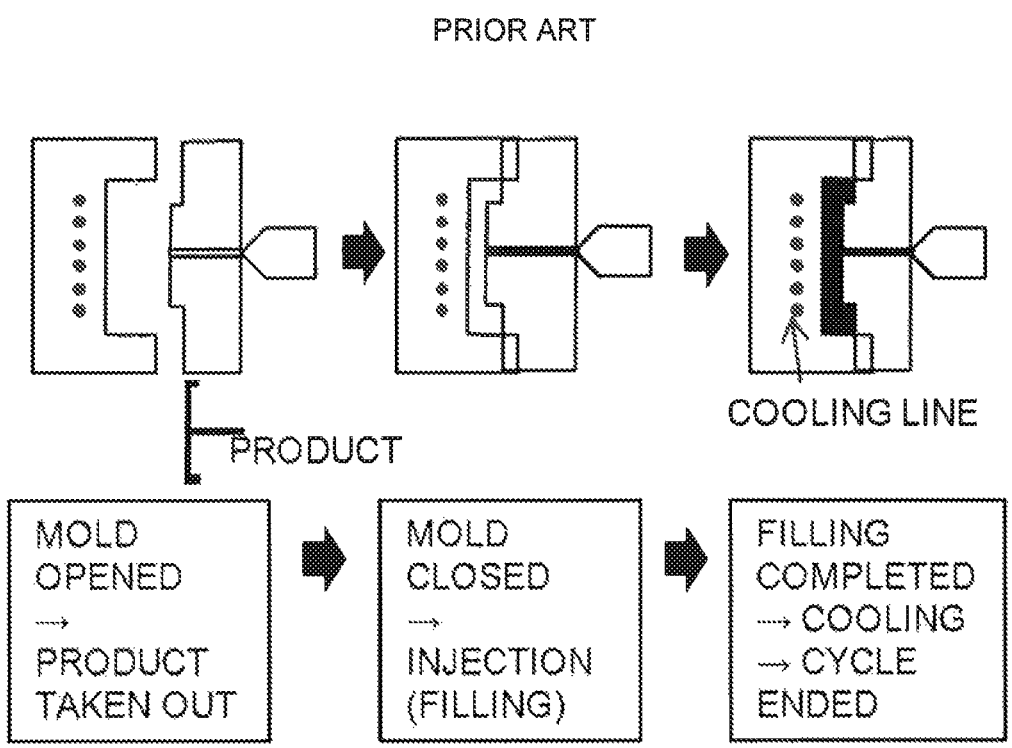
FIG. 2 is a process diagram exhibiting a conventional injection process.
Figure 3:
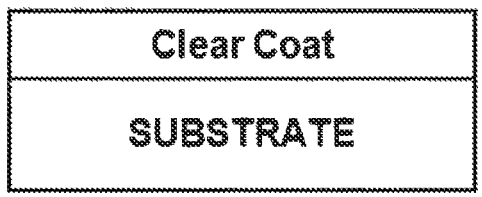
FIG. 3 is a cross sectional view exhibiting an arrangement of a high gloss substrate and a one coat painting composition primarily coated on the high gloss substrate according to an embodiment of the present invention.
Figure 4:
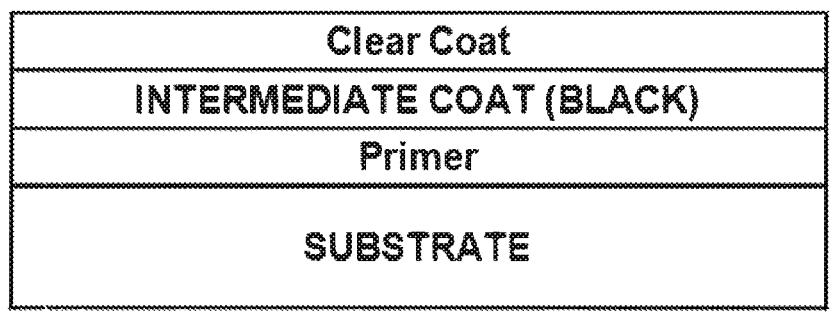
FIG. 4 is a cross sectional view exhibiting a substrate having a conventional painting composition tertiarily coated (i.e. through three coatings) on the substrate.

FIG. 1 is a process diagram exhibiting an injection molding process using a high gloss part manufacturing apparatus of Korean Patent Laid-open Publication No. 2003-48863 developed by the present applicant, and FIG. 2 is a process diagram exhibiting a typical injection molding process. Further, FIG. 3 is a cross sectional view exhibiting an arrangement of a high gloss substrate obtained by an injection molding process and a one coat painting composition primarily coated (i.e., directly coated on the substrate in a single coat) on the high gloss substrate according to an embodiment of the present invention. Furthermore, FIG. 4 is a cross sectional view exhibiting a substrate obtained by a typical injection process and a conventional painting composition tertiarily coated on the substrate (i.e., coated in a three layers).

By comparison between a coating layer of the substrate obtained by the typical injection process and coated with the conventional painting composition, and a coating layer of the high gloss substrate obtained by the injection molding process and coated with the painting composition of the present invention, the painting composition of the present invention makes it possible to maintain and improve a high gloss image/finish of a substrate and satisfy environment resistant properties of exterior parts, such as an adhesive property, weather resistance, and scratch resistance, through a primary coating (i.e., one coat). Meanwhile, the coating layer of the material obtained by the typical injection process and coated with the conventional painting composition is highly likely to be deteriorated in surface roughness due to hardening of a resin and requires coating three times.

Therefore, the one coat painting composition according to the present invention can make it possible to reduce costs and is more suitable for providing and maintaining a high gloss finish, and, thus, it can be widely applied to exterior part's (i.e., exterior plastic parts) of automobiles.

Hereinafter, the present invention will be explained in detail with reference to Examples below. However, it should be noted that Examples are provided only for illustration of the present invention, but the scope of the present invention is not limited thereto.

Examples 1 and 2

A one coat painting composition for high gloss was prepared according to a composition ratio as listed in Table 1 below and then extruded by a twin screw extruder (TSE), thereby preparing test specimens of Examples 1 and 2.

Comparative Examples 1 to 6

In the same manner as Examples 1 and 2, test specimens of Comparative Examples 1 to 6 were prepared by using raw materials as listed in Table 1 below.

According to the following methods, properties of the test specimens prepared in Examples 1 and 2 and Comparative Examples 1 to 6 were measured, and property values of the one coat painting compositions were as listed in Table 2.

TABLE 2

| Property values of one coat painting composition for high gloss | | | | | |
|---|---|---|---|---|---|
| | Gloss | Linearity (CF value) | Adhesion | Pencil hardness | Water resistance | Impact resistance |
| Example 1 | 95-97 | 79 | 100/100 | F | Good | Good |
| Example 2 | 95-97 | 77 | 100/100 | F-H | Good | Good |
| Comparative Example 1 | 93-95 | 66 | 100/100 | F-H | Good | Crack |
| Comparative Example 2 | 88-90 | 79 | 90/100 | B | N.G. | Good |
| Comparative Example 3 | 95-97 | 65 | 90/100 | HB-F | Good | Good |
| Comparative Example 4 | 95-97 | 67 | 100/100 | B-HB | Good | Good |
| Comparative Example 5 | 90-92 | 65 | 100/100 | HB-F | N.G. | Good |
| Comparative Example 6 | 95-97 | 70 | 90/100 | F-H | N.G. | Crack |

TABLE 1

Painting composition for high gloss (unit: parts by weight, with the polyester, first acrylic resin and second acrylic resin totaling 100 parts by weight, wherein the reaction catalyst, wetting additive, photo-stabilizer and solvent are based on 100 parts by weight of the first three components).

| | Composition | | | | | | |
|---|---|---|---|---|---|---|---|
| | Polyester | First acrylic resin | Second acrylic resin | Reaction catalyst | Wetting additive | Photo-stabilizer | Solvent |
| Example 1 | 40 | 20 | 40 | 1 | 0.5 | 1 | 35 |
| Example 2 | 20 | 20 | 60 | 1 | 0.5 | 1 | 35 |
| Comparative Example 1 | 0 | 40 | 60 | 1 | 0.5 | 1 | 35 |
| Comparative Example 2 | 60 | 0 | 40 | 1 | 0.5 | 1 | 35 |
| Comparative Example 3 | 40 | 0 | 60 | 1 | 0.5 | 1 | 35 |
| Comparative Example 4 | 20 | 60 | 20 | 1 | 0.5 | 1 | 35 |
| Comparative Example 5 | 50 | 50 | 0 | 1 | 0.5 | 1 | 35 |
| Comparative Example 6 | 20 | 10 | 70 | 1 | 0.5 | 1 | 35 |

Polyester: weight-average molecular weight (Mw) of 5000 to 7000, hydroxyl group content of 2.0 to 2.5%, and solid content of 80% (NOROO Paint & Coatings Co., Ltd.)
First acrylic resin: weight-average molecular weight (Mw) of 11000 to 13000, hydroxyl group content of 1.5 to 2.0%, glass transition temperature (Tg) of 24° C., and solid content of 60% (NOROO Paint & Coatings Co., Ltd.)
Second acrylic resin: weight-average molecular weight (Mw) of 8000 to 10000, hydroxyl group content of 0.5 to 1.0%, glass transition temperature (Tg) of 75° C., and solid content of 50% (NOROO Paint & Coatings Co., Ltd.)
Reaction catalyst: D.B.T.D.L (DIBUTYL TIN DAURATE), NITTO CHEMICAL INDUSTRY CO., LTD.
Wetting additive: BYK-306, (BYK-Chemie), dimethyl polysiloxane based
Photostabilizer: Tinuvin 1130, Tinuvin 292 (BASF)

Experimental Example

Measurement of Property of Test Specimen

The property results as listed in Table 2 were averages of the measurement values except upper limits and lower limits obtained by measuring seven specimens according to the following methods.

(1) Measurement of gloss: measured at 60° C. by using a glossmeter manufactured by BYK GARDNER.

(2) Measurement of exterior appearance: measured by using a Wavescan manufactured by BYK GARDNER. Herein, a CF value (linearity) as a comprehensive index of gloss, distinctness, and orange peel was compared.

(3) Measurement of adhesion (adhesive property with a material): A perforated line was drawn with a cutter to a predetermined position on a coating film surface so as to prepare 100 square boxes of 1 mm×1 mm. An adhesive cellophane tape was attached to the surface and rapidly peeled at an angle of 90°. Then, the number of the boxes remaining on the coating film was evaluated.

(4) Measurement of pencil hardness: evaluated as specified by ISO 15184 and JIS K 5600-54.

(5) Measurement of water resistance: After a specimen was left in a chamber filled with water at 40° C. for 240 hours, a change in exterior appearance (color change, crack, and swelling) was checked.

(6) Measurement of impact resistance: A weight of 500 g was dropped as specified by ISO 6272, and then a status of a coating film was checked.

As listed in Table 2, it could be seen from Comparative Examples 1 and 6 that when a content of the second acrylic resin was increased, a pencil hardness was increased but cracks occurred in terms of impact resistance and linearity was decreased. Further, it could be seen from Comparative Examples 2 and 3 that in the case of mixing the polyester resin and the second acrylic resin as main components, when a content of the polyester resin was high, a pencil hardness was decreased, and when the first acrylic resin was not used or used in a small amount, initial adhesion and a water resistance were not good. Furthermore, it could be seen from Comparative Examples 4 and 5 that when a content of the first acrylic resin was increased, initial adhesion and a water resistance were improved but linearity was gradually deteriorated, and when a content of the second acrylic resin was decreased, a water resistance and adhesion were deteriorated.

It could be seen from Comparative Examples 3 and 6 that a difference in impact resistance, even when a content of the second acrylic resin was high, meant that a content of the soft polyester resin was high and thus cracks did not occur. Meanwhile, in Examples 1 and 2, since the polyester resin and the first and second acrylic resins were used adequately, a coating film having excellent linearity and satisfactory properties such as a water resistance, and an impact resistance was obtained.

In other words, it was confirmed that the one coat painting compositions of Examples 1 and 2 according to the present invention had excellent properties such as gloss, linearity, adhesion, pencil hardness, water resistance, and impact resistance due to adequate use of the respective components as compared with Comparative Examples 1 to 6 which were not in accordance with the present invention.

The present invention can be widely used for exterior parts of automobiles and various plastic parts, such as pillar garnish parts, bumpers and their neighboring parts, particularly those requiring a coating process for providing a high gloss finish.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A one coat painting composition for providing a high gloss finish comprising:
   100 parts by weight of a base;
   about 1.0 to 1.5 parts by weight of a reaction catalyst;
   about 0.1 to 1.0 part by weight of a wetting additive;
   about 1.0 to 1.5 parts by weight of photostabilizer; and
   a solvent;
   wherein the base comprises about 15 to 45 wt % of a polyester resin, about 15 to 25 wt % of a first acrylic resin, and about 35 to 65 wt % a second acrylic resin, wherein the amounts of polyester resin, the first acrylic resin, and the second acrylic resin total 100 wt % of the base.

2. The one coat painting composition of claim 1 wherein:
   the reaction catalyst is a urethane reaction catalyst;
   the wetting additive is a polyester siloxane-based wetting additive; and
   the photostabilizer is a UV absorber.

3. The one coat painting composition of claim 1, wherein the polyester resin has a weight-average molecular weight of about 3000 to about 10000, a hydroxyl group content of about 2 to 4 mol %, and a solid content of 80 wt % with respect to the total weight of the polyester resin.

4. The one coat painting composition of claim 1, wherein the polyester resin is produced through a condensation reaction between an alcohol compound and an acid; wherein the alcohol compound is at least one of diethylene glycol and methylpropanediol; and wherein the acid is at one of adipic acid and isophthalic acid.

5. The one coat painting composition of claim 1, wherein the first acrylic resin has a weight-average molecular weight of about 6000 to about 15000, an acid value of about 2 to 6 mg KOH/g, a hydroxyl group content of about 1 to 5 mol %, a glass transition temperature of about 20 to 30° C., and a solid content of about 60 wt % or more based on total weight of the first acrylic resin.

6. The one coat painting composition of claim 1, wherein the second acrylic resin has a weight-average molecular weight of about 6000 to 15000, an acid value of about 0.5 to 2 mg KOH/g, a hydroxyl group content of about 0.2 to 2 mol %, a glass transition temperature of 70 to 80° C., and a solid content of 40 wt % or more based on total weight of the second acrylic resin.

7. A coating method comprising: adding a curing agent to the one coat painting composition of claim 1 to form a curable painting composition; applying the curable painting composition to a substrate; and curing the applied curable painting composition.

8. The coating method of claim 7, wherein the reaction catalyst is a urethane reaction catalyst comprising a hydroxyl group as a main component, and the curing agent is a hexamethylene diisocyanate trimer-based agent.

9. The coating method of claim 8, wherein the curing agent is present in an amount such that a ratio of the curing agent to hydroxyl group is about 1:2 to 1:4 wt %.

* * * * *